United States Patent
Leslie et al.

(10) Patent No.: US 12,340,460 B2
(45) Date of Patent: Jun. 24, 2025

(54) VARIABLE UPDATE ADAPTATION AND SIMULATION DELAY IN MULTIUSER VIRTUAL REALITY APPLICATION

(71) Applicant: VRChat Inc., San Francisco, CA (US)

(72) Inventors: Dan Leslie, Lantzville (CA); Jesse Joudrey, Port Coquitlam (CA)

(73) Assignee: VRChat Inc., San Francisco, CA (US)

( * ) Notice: Subject to any disclaimer, the term of this patent is extended or adjusted under 35 U.S.C. 154(b) by 291 days.

(21) Appl. No.: 17/890,844

(22) Filed: Aug. 18, 2022

(65) Prior Publication Data

US 2024/0062456 A1 Feb. 22, 2024

(51) Int. Cl.
*G06T 15/20* (2011.01)
*G06T 13/40* (2011.01)
*G06T 13/80* (2011.01)
*G06T 19/20* (2011.01)
*H04L 43/062* (2022.01)
*H04L 67/131* (2022.01)

(52) U.S. Cl.
CPC .............. *G06T 15/20* (2013.01); *G06T 13/40* (2013.01); *G06T 13/80* (2013.01); *G06T 19/20* (2013.01); *H04L 43/062* (2013.01); *H04L 67/131* (2022.05); *G06T 2200/16* (2013.01); *G06T 2219/024* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 10,146,877 B1* | 12/2018 | Zolnieryk | G06F 3/0487 |
| 2013/0055136 A1* | 2/2013 | Aaron | H04L 12/1485 |
| | | | 715/772 |
| 2021/0358222 A1* | 11/2021 | Pejsa | G06F 3/0346 |
| 2023/0152935 A1* | 5/2023 | McKenzie | G06T 15/20 |
| | | | 715/733 |
| 2023/0351710 A1* | 11/2023 | Doyle | G06F 3/011 |
| 2024/0265661 A1* | 8/2024 | McLachlan | G06T 7/20 |

* cited by examiner

*Primary Examiner* — Yi Wang
(74) *Attorney, Agent, or Firm* — Polsinelli PC

(57) ABSTRACT

The present technology pertains to variable updates to objects and synchronizing the objects within a multiuser virtual reality (VR) application. In one aspect, a client device that is participating in the multiuser VR application can subscribe to events from an object and receive updates at an identified subscription rate. Objects can have different subscription rates to ensure that relevant objects within the environment are updated more frequently that objects that are not relevant to the user experience. In another aspect, the client device can determine a simulation time associated with objects within the environment to synchronize objects that are related and provide a high-fidelity animation of those objects.

18 Claims, 12 Drawing Sheets

VARIABLE UPDATE ADAPTATION AND SIMULATION DELAY IN MULTIUSER VIRTUAL REALITY APPLICATION

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be a shape of the shoulders and a head without any distinguishing features. Some avatars can be complex and can be associated with detailed graphics, textures, and can be capable of various animations. For example, some avatars include a number of portions that are separately animated for realistic or non-realistic motion, e.g. hair, tails, ears, clothing, etc. In some cases, a multiuser virtual reality application can have hundreds of avatars and corresponding client devices interacting within that environment.

BRIEF DESCRIPTION OF THE DRAWINGS

To easily identify the discussion of any particular element or act, the most significant digit or digits in a reference number refer to the figure number in which that element is first introduced.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
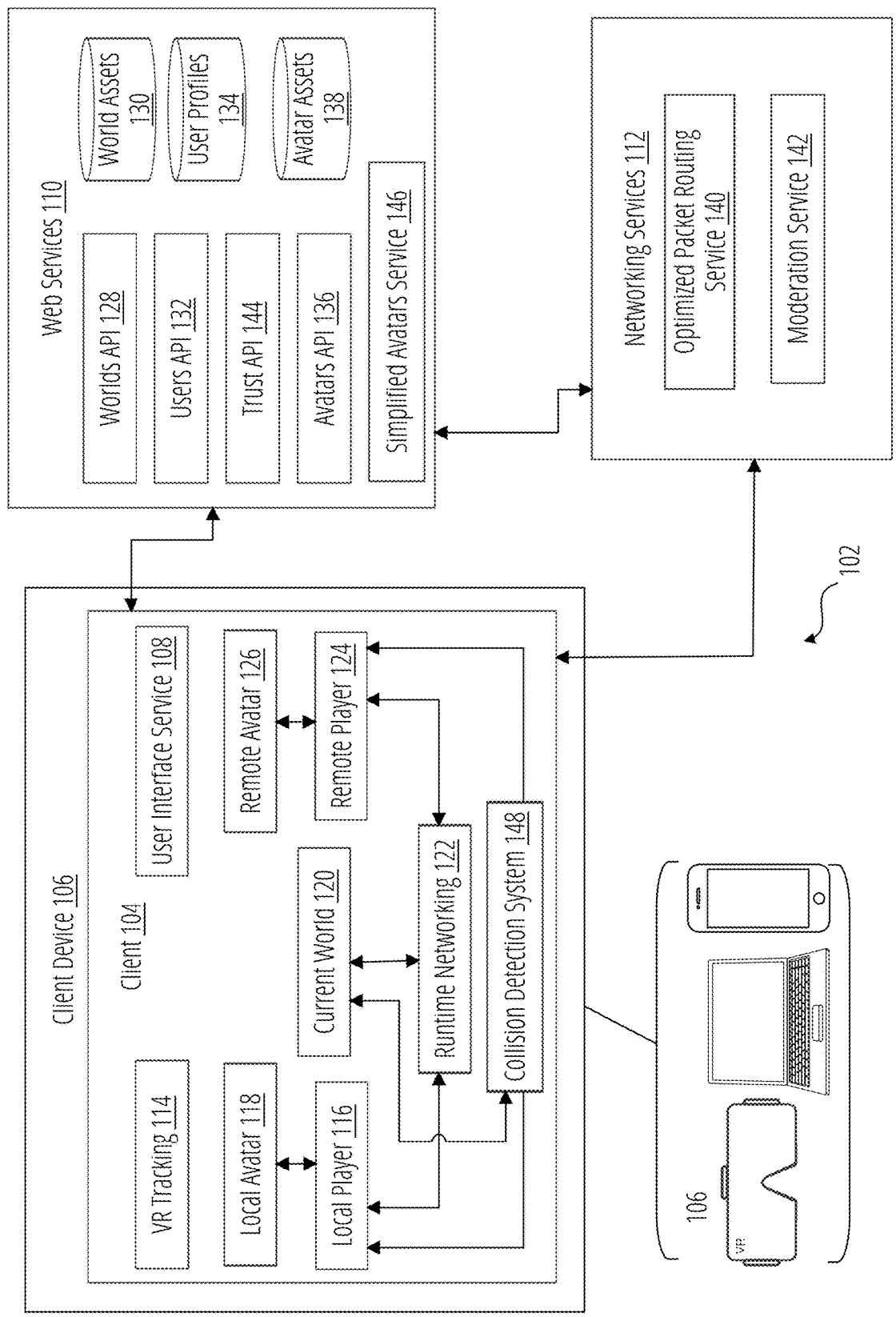
FIG. 1 illustrates an example virtual world platform for playing and hosting a multiplayer virtual reality (VR) experience in accordance with some aspects of the present technology.

Interactions between users in virtual worlds such as those hosted by some virtual reality platforms continue to evolve. Initially interactions were limited to co-existing in the same world and playing a game together. Interactions progressed to live communications, and then to attending virtual events together. Recently, users have begun to increase the range of motion of their avatars to interact within these virtual worlds and with objects within the virtual world. For example, characters within the virtual world are now able to exercise or dance at a nightclub in virtual worlds, and various contact-based interactions between characters can occur and trigger events that occur within the virtual world.

Contact-based interactions within a virtual world are contextual and may not be relevant to each character. Providing all events within the virtual world to each user within the virtual world may flood a corresponding client device with immaterial events. For example, objects within the virtual world can be located at far distances from an avatar, and events that occur to those objects at far distances are not as important as events associated with objects at close distances. The present technology solves this problem and other problems related to events within a virtual world.

An aspect of the present technology relates to identifying objects within the virtual world that are relevant to an avatar associated with an application executing on a client device and subscribing to events associated with those events. A subscription is received by a server and provides updates to those objects based on any relevant events at a subscription rate provided by the client device. In the event there is no update to the object, the server does not need to update the application that is executing the client device. The present technology also allows the client device to identify any relevant events and provide those events to the client device at a subscription rate identified by the client device. The objects within the virtual world can be subscribed to at different subscription rates to allow the application to prioritize events that are more relevant. For example, events that occur 100 meters from the avatar may not be relevant to the events that occur 3 meters away. The events at a large distance away may reduce their subscription rate to allow the client device because any events are not necessarily within a region of interest associated with the avatar.

A challenge associated with the present technology also pertains to synchronizing different objects within the virtual world, which may have a different source (e.g., be input by different users). The objects within the virtual world are user-defined, including three-dimensional (3D) assets such as avatars, objects within the world, or other objects defined by users. The virtual reality platform may have a limited understanding of these objects as they are user-defined (e.g., objects may be screened for suggestive content), but the virtual reality platform is responsible for synchronizing these objects and presenting animations related to these objects based on user input in a believable manner. Events to objects in the world that are not correctly synchronized affect the user experience and reduce any immersion. However, objects within the environment are susceptible to being presented in an unsynchronized order to network latency, jitter, and other network performance issues.

An aspect of the present technology relates to synchronizing objects within the virtual world using a simulation time. The simulation time is a single value that is determined based on network parameters and other relevant information within the virtual world. Each object within the virtual world may be associated with a simulation time and affect the rendering of the object within the virtual world to allow related objects to be rendered in a manner that synchronizes related objects to present a cohesive virtual world. While some aspects of the simulation time are parasitic effects (e.g., delay, jitter) and cannot be controlled by the device, the simulation time is related to the subscription rate. In one example, the present technology can shift the simulation time of different objects based on relationships to synchronize the objects and provide high-fidelity animations within the virtual world.

Another aspect of the present technology relates to grouping objects and controlling simulation times for objects within that group. If objects within that group have different simulation times, the rendered animations of objects in that group may have a low fidelity due to visual artifacts of other effects. In this case, it is advantageous for the simulation times of each object in the logical group to be adjusted towards an optimum simulation time and improve the fidelity of the rendered animation. The present technology describes methods for grouping objects within the virtual world and determining optimum simulation times to ensure that objects within that group are synchronized to provide an immersive and compelling experience.

Another aspect of the present technology relates to extending or compressing time that may occur based on changes in the subscription rate. In response to the subscription rate change, updates related to the object will become more frequent. In that case, the client device may be configured to render queued updates to that object based on a future time from a current time in the virtual world. In one illustrative example, the future time is half a round trip time to the server.

Another aspect of the present technology relates to subscribing to updates to the virtual world from the server based on a network parameter. For example, the client device may be configured to provide a network parameter, such as an upper boundary on a network volume per unit time, such as 60 kilobytes per second (60 kbps), and the server is configured to stream updates to the virtual world based on the network parameter. In one illustrative aspect, the client device can suggest subscription rates, rank objects based on priority, or group objects, and the server can stream data based on the volume of updates.

These and other benefits of the present technology will be addressed further herein.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio- and-visually mute anybody who is not a friend.

After a user has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics. In some embodiments the avatar assets include colliders and receivers defined on portions of the avatar, or a tree of transforms that cause portions of the avatar to exhibit secondary motion behaviors (e.g., dynamic or phys- ics bones (aka phys. bones) are examples systems that can configure portions of the avatar to exhibit secondary motion behaviors).

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides informa- tion about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The client 104 can also support contact interactions between avatars, a portion of an avatar with another portion of the same avatar, or a portion of an avatar with an object in a virtual world. In order to detect these interactions, the client 104 can be configured to detect collisions between objects using the collision detection system 148. In some embodiments, the collision detection system 148 can be a broad phase collision detection system.

The current world 120 also has features that require networking. The current world 120 could have objects that a user can interact with and dynamically change aspects of the current world 120, and the object needs to broadcast its state across the network so that other users in the current world 120 can view the current state of the object. In one illustrative example, the current world 120 can include a light switch that dynamically affects a light source within the current 120, such as turning on or off the light.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking service such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
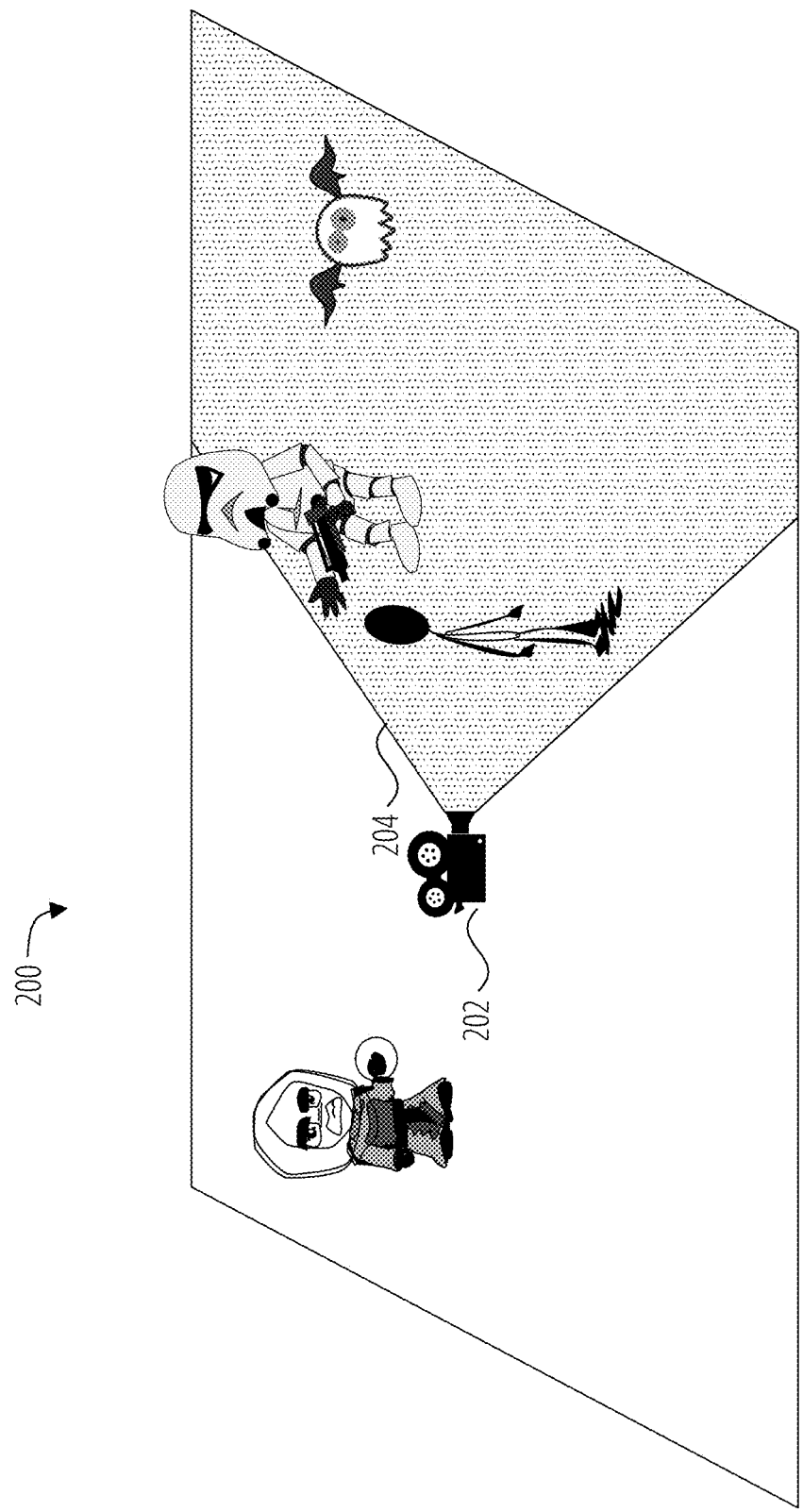
FIG. 2 is a conceptual illustration of a virtual world that is rendered by a client device according to aspects of the disclosure.

FIG. 2 is a conceptual illustration of a virtual world that is rendered by a client device according to aspects of the disclosure. In one illustrative aspect, the virtual world 200 includes an ideal camera 202, such as a pinhole camera, that is used to render the 3D virtual world into at least one frame (or image) that is displayed on the client device. In the event that the client device is a head-mounted display (HMD), the ideal camera 202 may be two cameras that are separated by a distance to simulate the interpupillary distance between the eyes to create two images for a stereoscopic image. The ideal camera 202 has a field of view (FOV) 204 and the client device renders objects within the FOV 204 for each frame. In one illustrative example, the client device may perform a screen space projection and rasterization based on the ideal camera 202 to construct a 2D image of the virtual world 200. In another illustrative example, the client device may implement a raycasting technique or a ray tracing technique to render the virtual world 200 into a 2D image.

As illustrated in FIG. 2, the FOV 204 of the ideal camera 202 does not capture all content in the world, and content within the FOV 204 may not be visible due to an intervening object. The objects closest to the ideal camera 202 are most likely to be the most relevant, but objects that are a distance away can also be the most relevant. For example, the objects associated with the performance of a virtual reality concert may be the most relevant objects, and there may be intervening objects that may be less relevant to the experience.

In some cases, the virtual world may be rendered using a first-person perspective, such as a user that is wearing an HMD. In other cases, the virtual world may also be rendered using a third-person perspective, such as when the user is participating within the virtual world using a handheld device such as a mobile phone, a tablet, or a laptop. In this case, the ideal camera may be positioned at a different location to allow the camera to capture the avatar associated with the user. In some cases, the third-person perspective may be used within a VR context to provide a panoramic view, or the first-person perspective may be used on a handheld device.

The client device may have limited processing power while the virtual world 200 may have a varying number of objects that are interacting within that virtual world 200. For example, a virtual concert in the virtual world may have thousands of participants. If the client device receives every object's events, the client device would be flooded with network data and would not be able to decode the network data and render the scene at a frame rate that would provide an immersive experience. The aspects disclosed within relate to a dynamic subscription rate that is determined by the client device for objects that can or may be related to the scene. The aspects disclosed further relate to a simulation time that is determined for each object to synchronize the rendering of various objects within the virtual world.

Figure 3:
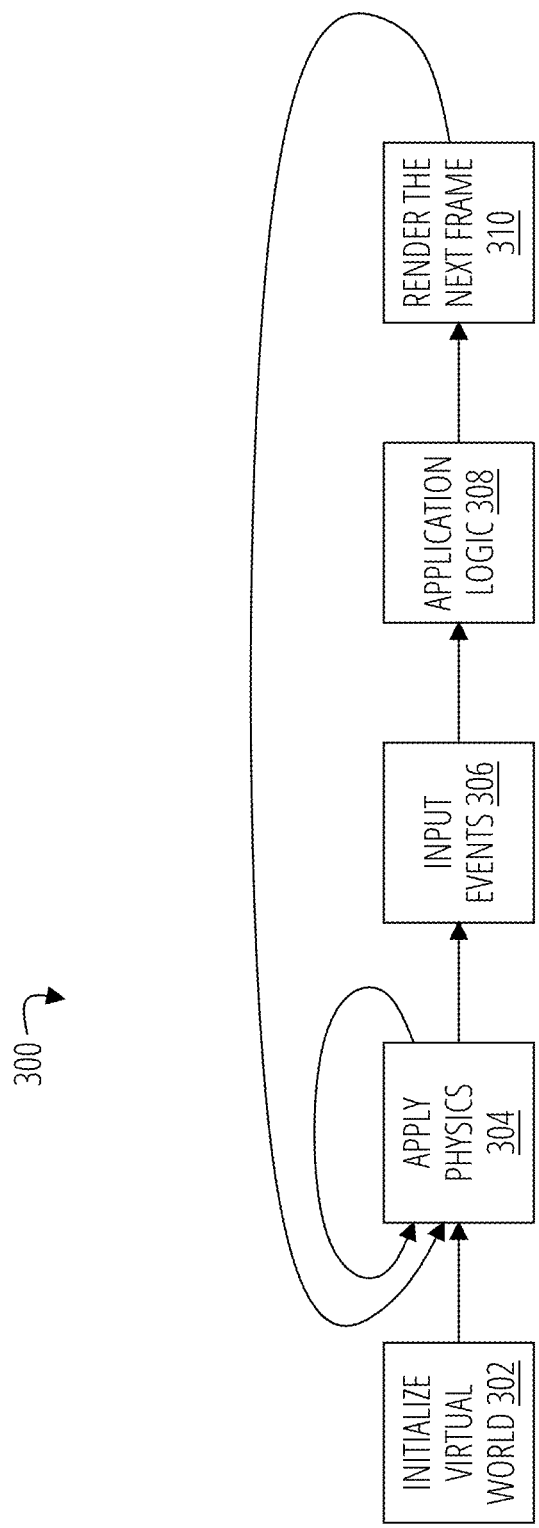
FIG. 3 is an illustration of an application loop of a client application that is executed on a client device in accordance with some aspects of the disclosure.

FIG. 3 is an illustration of an application loop of a client application that is executed on a client device in accordance with some aspects of the disclosure. In some aspects, the client device executes the client application (e.g., a virtual world application) and configures the client device to perform functions associated with a virtual world.

In one illustrative aspect, the client application causes the client device to perpetually execute the application loop until the application exits. For example, when the client application is started, the application loop begins by initializing the virtual world at block 302. Operations at block 302 may include loading the application and necessary assets into memory, connecting to a server to retrieve any network objects such as a user-defined virtual world and other user-defined avatars that are associated with the virtual world, and configuring necessary assets to begin rendering the virtual world.

After initialization, the application loop may apply physics at block 304 to objects within the virtual world. For example, if a ball is traversing at an initial trajectory, the movement of the ball is computed at block 304. Similarly, various other animations may be determined at block 304, such as triggering animation events, performing callback functions to various objects within the virtual world, applying inverse kinematic (IK) effects to objects within the virtual world, etc. In some cases, the client device may be configured to apply physics to objects within the virtual world multiple times during the rendering of a single frame because a physics engine should be called on a consistent time interval to ensure accurate physics calculations.

At block 306, the application loop includes identifying any input events (e.g., user input from a screen, a game controller, or an HMD input controller that a person manipulates to provide input. Operations at block 306 can also include network-related events such as receiving network data from a server and buffering the network data. The network data can identify events that occur within the virtual world that are provided by a third party, such as another user device that corresponds to an avatar within the virtual world. For example, the network data can relate to the movement of the avatar within the virtual world from a first location to a second location, an animation of the avatar such as swinging a tennis racket, or interacting with an object to trigger a collision. The network data can also relate to motion that is input at the other user device. For example, the other client device can be configured to capture motion input from the other user, such movement of an arm to swing a tennis racket or throw a ball within the virtual world. The other client device can detect this motion using various sensors and provide the detected motion to the server, which an serve as a basis for events within the virtual world.

The client device is generally unable to visualize events in real-time due to transmission latency and various delays that can occur between the client device and server. To accommodate changes in network conditions, the client device may buffer network data and stream the buffered network data to ensure that network data is consistently provided to an application executing on the client device. Buffering the network data allows the bursty nature of some network connections to provide constant flow of data and can provide a constant stream of network update within the application.

The application loop takes any input (e.g., user input at the client device, network data, results of the physics, etc.) and then applies the input to the application logic at block 308. The client device processes the application logic based on the inputs at block 308. For example, the application logic may identify events such as motion or a collision between objects, identify an effect associated with various events (e.g., fireworks emitting from a collision that emitted when a high five interaction is detected between two different avatars), and process the events. In some cases, the application logic can build a time-series based buffer that corresponds to events that occur across multiple frames, such as the emitting of fireworks. For example, the time-series based buffer can be a buffer of events that occur at specific times from an event. In the case of two avatars interacting, a first avatar may emit an event at that time, and the other avatar may schedule an event that occurs after a small delay.

After the application logic, the application loop renders a frame based on the execution of the application logic at block 310 and then outputs the frame to the client device. After rendering and displaying the frame at block 310, the application loop returns to block 304 to execute the blocks 304 to 310 to render the next frame.

In some aspects, the various blocks that are illustrated in FIG. 3 can be arranged in different orders, for example, the input can be provided before applying physics. The application loop 300 is exemplary and corresponds to the game loop associated with the UNITY engine.

Figure 4:
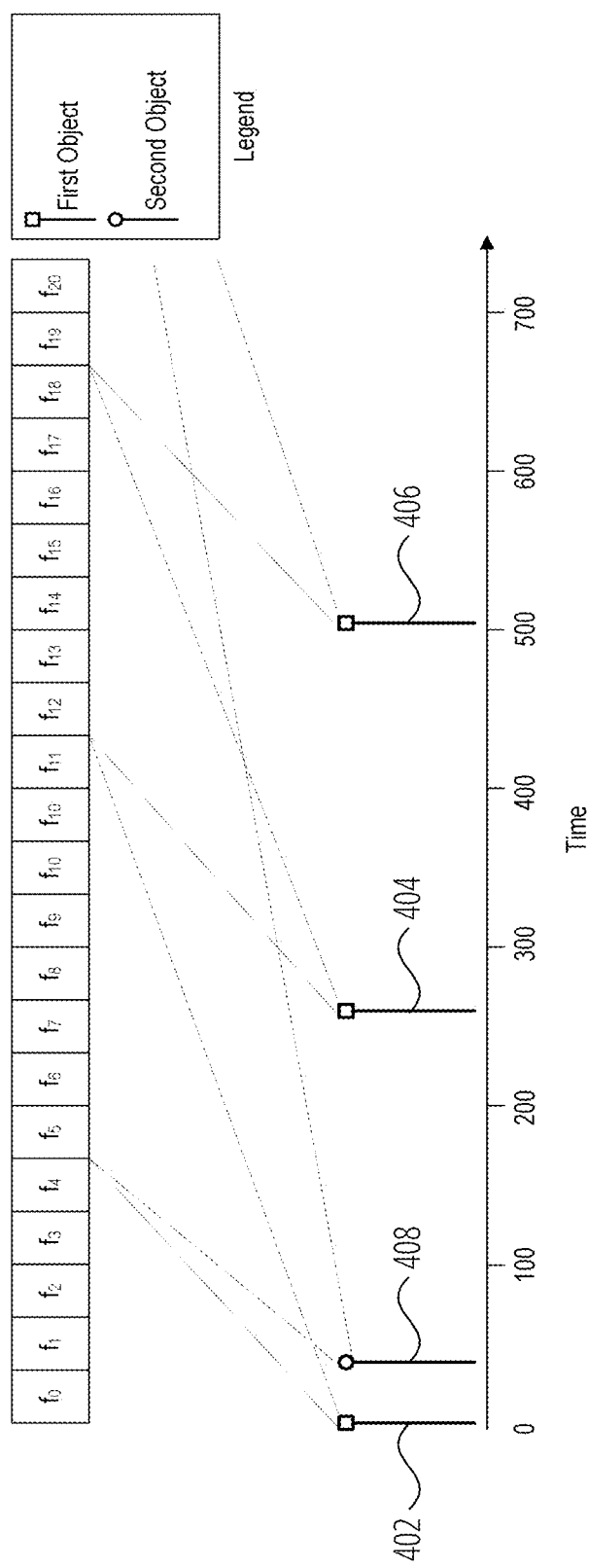
FIG. 4 is a timing diagram that illustrates objects within the virtual world having different subscription rates in accordance with some aspects.

FIG. 4 is a timing diagram that illustrates objects within the virtual world having different subscription rates in accordance with some aspects. A subscription is related to a client device requesting updates to an object based on changes within the virtual world. An example of a subscription is the observer pattern, in which dependent objects subscribe to changes from an object that is referred to as the subject. Based on the subscription, a server may send updates to changes to that object, which can be provided to the server from another avatar associated with a different client device. A subscription rate is a desired rate of updates to the subscribed object in the virtual world that a client device requests from a server. A subscription rate may be correlated to a saliency of the object within the virtual world based on the user experience, and the saliency may be determined by the client device. For example, objects near an avatar in the virtual world, which is associated with a user of a client device, may have a higher saliency than objects that are far away. The saliency can also be based on a FOV associated with the client device, whether the object is an avatar, the object is being controlled or manipulated by another avatar, whether the object was rendered (e.g., visible to the client device), and whether the object received any updates from the server (e.g., moved, received an interaction, etc.). For example, an HMD device that uses a first-person perspective may use objects within the FOV with a higher saliency, but objects that are within a substantially similar distance and located behind the FOV may have a lower saliency. In another example, a client device renders the virtual world with a third-person perspective and may treat all objects within a particular radius of the avatar with the same saliency.

The subscription rate is configured to ensure that data relevant to objects within the virtual world are delivered at a higher rate than objects that are not as relevant. For example, an event that occurs 100 meters away between two different avatars may not relevant to the current experience provided to the client device. The client device is configured to identify objects relevant to the client device and determine a subscription rate for those objects. In one aspect, as described in further detail below, the client device may identify a simulation time of the objects, which is used to determine how to render the object, and determine to change the simulation time to provide high fidelity animations. The client device then request the server to provide the network data related to the objects based on a subscription rate which, as described in further detail below, can affect the simulation time.

The server can respond to the subscription rate in different scenarios. If the server is not taxed (e.g., under a heavy processing load), the server may provide the subscription rate for that object. The server may also adjust the subscription rate based on various measured parameters, such as a volume of network traffic, a processor utilization, an average thread compute time, and so forth. The server may gate (e.g., reduce) traffic by decreasing the network updates based on distance between the objects. The server may also negotiate the subscription rate with the client by suggesting a different subscription rate, which the client can accept or further revise the requested subscription rate based on the server reply.

In the example timing diagram illustrated in FIG. 4, the client device is presumed to render images at 30 frames per second (FPS) rate and a frame is rendered every 33.33 milliseconds (ms). FIG. 4 depicts 21 frames $f_0$-$f_{21}$ that are rendered within 700 ms and three network data events are received from the server. For example, a client device subscribes to events from a first object at a rate of every 250 milliseconds (ms) (e.g., 4 Hz) and subscribes to events from a second object at a rate of every 1 second (e.g., 1 Hz). In other examples, the frame rate can be higher or lower depending on the device capabilities and various factors. For example, a VR headset can cause nausea for many wearers with frame rates lower than 90 Hz and a tablet may be permitted to render at a lower rate, such as 24 Hz, in various scenarios.

In the timing diagram, the application receives, based on the subscription to the first object, first network data 402 is received at 0 ms, second network data 404 is received at 260 ms, and third network data is received at 510 ms. The application also receives a single network data 408 for the second object at 40 ms.

Because the application does not receive network data for each frame, the client device is configured to interpolate the motion identified in the network data across different frames based on a number of factors and then render the motion in different frames. In this illustration, events that occur in the first network data 402 are rendered in frame f5 to frame f11, events that occur in the second network data are rendered in frame f12 to frame f18, and events that occur in the third network data are rendered in frame f19 to another frame that is not illustrated in FIG. 4. Events that occur in the fourth network data 408, which correspond to events related to an object that are not prescient, are rendered in frames f5 to another frame that is not illustrated in FIG. 4.

The application does not immediately process the network data and determines when to render events that occur in the virtual world based on a number of factors. When different objects are in motion, these objects can render in an unsynchronized order. If the events are not related, then the synchronization does not pose an issue, but related objects within the scene should be rendered in a manner that is synchronized. Further complicating the determination of when to render is the fact that network data does not travel in a consistent manner and delay, latency, jitter, and other issues can affect when the network data for different objects is received.

The variation of network data performance may be resolved by a simulation time associated with each object in the virtual world. The simulation time is used to synchronize objects within the virtual world and interpolate the motion of objects based on the network data to synchronize those objects and present a cohesive experience. This approach is different from online gaming, which uses predictive input based on current input to identify events that occur in the future. The server in that case stipulates to the predictive input to allow client devices to render a scene and perform various functions such as hit detection (e.g., if a virtual bullet contacts a player's hit detection region).

Figure 5:
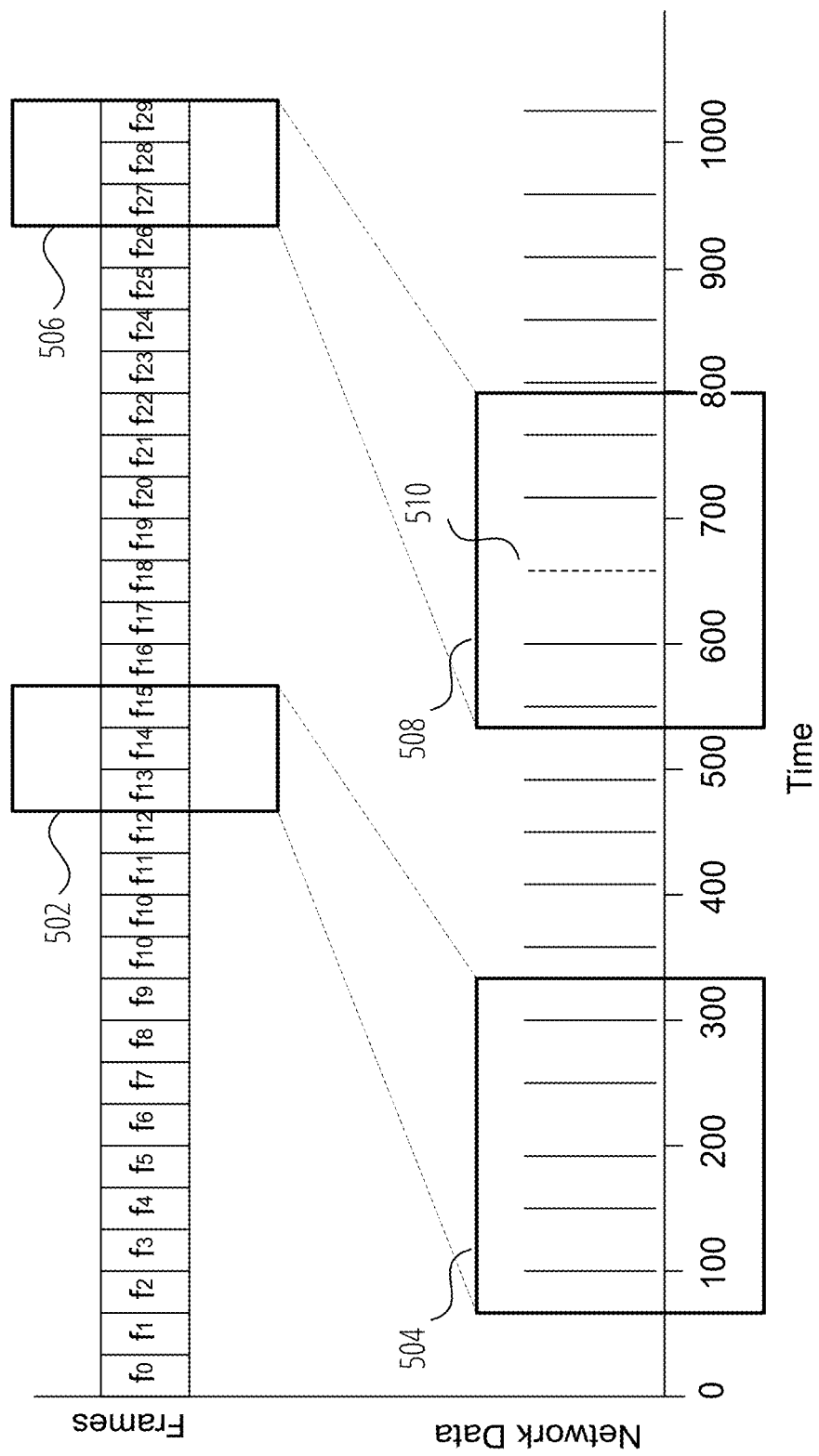
FIG. 5 is a timing diagram that illustrates determining a simulation time based on a subscription rate in accordance with aspects of the disclosure.

FIG. 5 is a timing diagram that illustrates determining a simulation time based on a subscription rate in accordance with aspects of the disclosure. In this illustrative aspect, a client device is presumed to render images at 30 FPS and an object is presumed to have a subscription rate of 20 Hz. Data for a single object is illustrated in FIG. 5 for clarity, and client devices would subscribe to updates from other objects in the virtual world.

The application is configured to buffer network data for objects and render the object based on the accumulated network data in that buffer. For example, the network data is buffered and rendered at a later time as noted above. During the application loop, the application may determine a simulation time for the object based on network data using a sliding window average.

In some aspects, the simulation time is related to the network performance of the object (e.g., latency, jitter, etc.), the subscription rate of the object, the last time that the object receives data from the server, a hitching rate (e.g., a missing update or missing network data), and average interval between network data samples associated with the object. The described parameters are examples, and other parameters can be used to determine the simulation time. In some examples, the simulation time is determined based on running averages (e.g., a sliding window) of each parameter, and the simulation time can be determined based on running averages and standard deviations of an of those average.

For example, the application may determine a simulation time 502 for frame $f_{13}$ to frame $f_{15}$ based on network data received during a sliding window 504 between 75 to 325 ms, which is a running average of network data within 250 ms from a most recent network data to be used for rendering the frame. In some aspects, the sliding window can include the most recent network data (e.g., contemporaneous network data received during frame $f_{13}$ to frame $f_{15}$).

The application may determine the simulation time of the object based on the network data within the sliding window 504. In one aspect, the simulation time can be based on network characteristics associated with network data that include information related to the object. In one aspect, the application may track network characteristics and build a set of data related to the network characteristics. For example, the application may track at least one average network parameter, such as a latency of the network connection, a jitter of the network connection, hitching of the object (e.g., missing updates) an interval between network data for the object based on the subscription (e.g., a time-to-next update), and an average time to update for the object. The averages may be performed using a sliding window average, or a running average. The window associated with the averages can also vary. For example, a world object (e.g., an object associated with the virtual world) may be stationary and not have any related updates within 2 seconds, and this parameter (e.g., the average time to update for the object) may have a larger window than other network parameters.

Based on the network data and the simulation time associated with the object, the application determines that a portion of network data will be rendered in frame $f_{13}$ to frame $f_{15}$. For example, the application subtracts the simulation time from the current time associated with the application to yield a local time of the object. The local time informs the client device of when updates associated with the object should be rendered within the virtual world and applied to other logic for collision detection, physics, etc. Based on the local time of the object, the application interpolates the events (e.g., motion) identified in network data and causes the application to render the object.

Rendering multiple objects that are controlled by other client devices in a synchronous manner to create a compelling and immersive experience is challenging, particularly if the network data associated with those objects are received at different times based on dynamic network conditions. For example, two objects at a far distance are updated infrequently (e.g., 1 second) and perform an interaction that renders a contact effect, such as fireworks that emit from that contact. For the experience to have sufficient fidelity, each object should perform the corresponding animation that triggers the effect at substantially the same time, otherwise, the effect could occur before one of the objects performs the corresponding animation. The simulation time for different objects within the virtual world provides a source of truth for objects and effects within the virtual world, and enables animations and other events within the world to be synchronously rendered. The simulation time synchronizes animation, motions, or other effects of objects while minimizing adverse effects such as latency and jitter.

Rendering multiple objects, which can have provided by different client devices, across a network can cause the animation of various objects within the virtual world to be out of context. By creating a simulation time for different objects within the virtual world, the animations and other events that occur in the virtual world have a ground truth and animations can be rendered in synchronization despite objects within the virtual world having different latencies.

The simulation time 506 associated with the object for frame $f_{27}$ to frame $f_{30}$ may use the same length of a sliding window 508 for the network parameters. However, network data for the object in some cases may not arrive due to a number of issues. In this case, a network data 510 associated with an update for the object may be hitched (e.g., missing). For example, the packet may have been inadvertently dropped in network transmit, the packet may have not decoded due to a packet error, or may have not arrived in time. In this case, the network parameters associated may have changed and the simulation time may increase due to the hitched network data.

Figure 6:
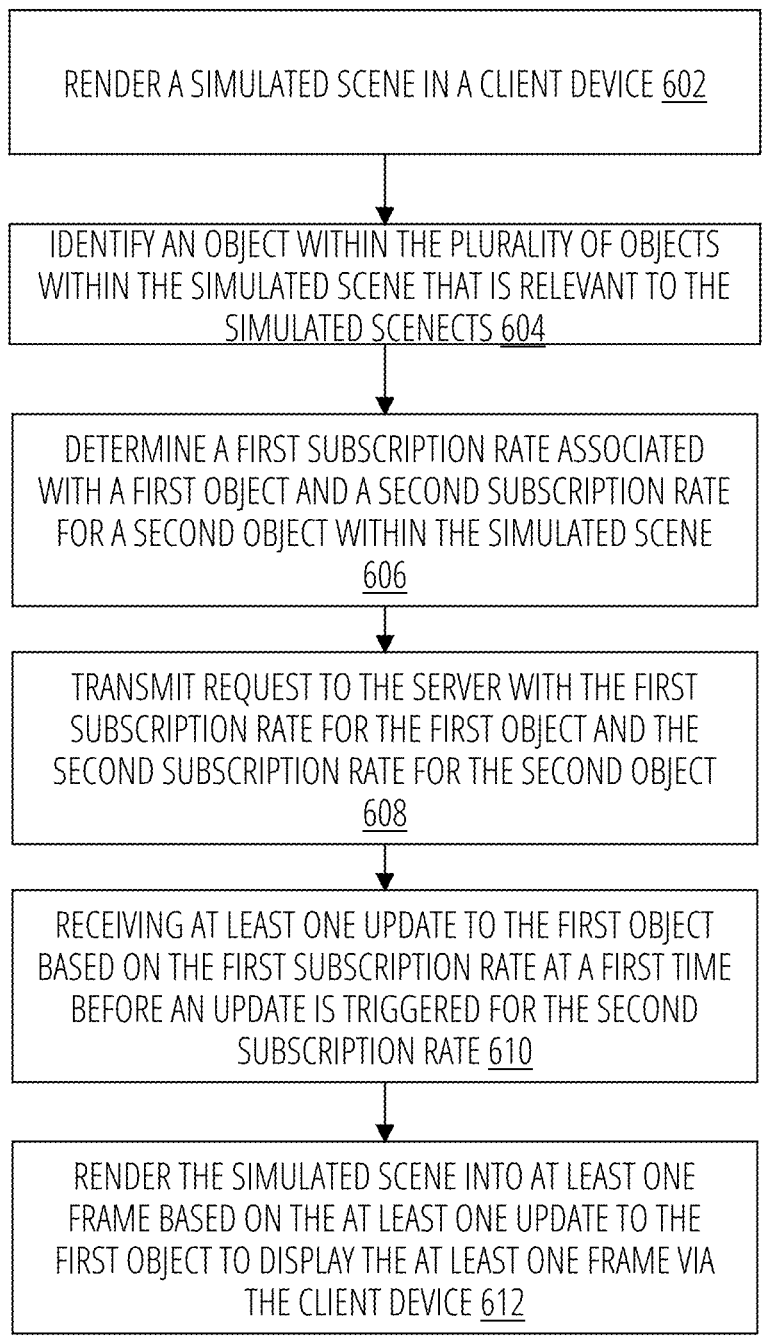
FIG. 6 illustrates an example method for enabling a variable update subscription of objects in a virtual reality multiuser application in accordance with some aspects of the disclosure.

FIG. 6 illustrates an example method for enabling a variable update subscription of objects in a virtual reality multiuser application in accordance with some aspects of the disclosure. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to one aspect, the example method is performed by a client device, such as a standalone HMD device, or a fixed computer system (e.g., computing system 1200) that displayed rendered frames using an HMD, or a tablet executing the virtual reality platform. In some aspects, the HMD can include an eye sensor that is configured to track a position of eyes of a wearer to identify a focal region and a dilation of the eyes.

According to some examples, the method comprises rendering (e.g., by the computing system 1200) a simulated scene in a client device at block 602. In one example, the virtual world is provided to the server that is provided by another client device that identifies other objects in the virtual world that can interact with the other objects. For example, a user can create a customized virtual world for interaction, and these interactions can be custom and unique to allow interaction, such as playing a musical instrument or playing a simple game based on created objects within the world (e.g., a tennis court, etc.). The simulated scene can include a plurality of objects within a virtual world that are rendered into the simulated scene based on information provided from a server that coordinates with other client devices. For example, the objects can be other avatars that are created by other users, who have connected to an instance of the virtual world.

According to some examples, the method includes identifying (e.g., by the computing system 1200) an object within the plurality of objects within the simulated scene that is relevant to the simulated scene at block 604. The object may be an avatar associated with another client device that is rendered in the simulated scene. An object may also be associated with an avatar (e.g., a tennis racket held by an avatar), or an object associated with the virtual world that can be interacted with, such as a tennis ball that is associated with the virtual world.

In one illustrative example, the identification of the object can be based on a combination of head movement tracking and eye movement tracking. The head movement can identify an orientation of the wearer's head and an eye sensor can identify a focal point within the scene, which may affect a salient region (e.g., a foveated region) within the rendered scene. Objects within the salient region may be culled and subscription rates of these objects can be modified.

In another illustrative example, the identification of the object can also be detected based on a visual see through (VST) application, which is an application that combines captured images (e.g., using an image sensor) with images that are rendered. For example, a HMD that covers a wearer's eyes can include one or more image sensors for capturing images associated with the physical environment and merging the images to create an XR environment. As an example, a user can be positioned at a table for a meeting and avatars can be superimposed into the images from the physical environment to appear seated at the table. In this case, blending of images from the camera and rendered images of the application can be used to identify objects of interest (e.g., objects on the table, etc.).

According to some examples, the method includes determining (e.g., by the computing system 1200) a first subscription rate associated with a first object and a second subscription rate for a second object within the simulated scene at block 606. The first subscription rate is greater than the second subscription rate. For example, the first object may be an avatar that is playing a tennis match with the user of the client device within the virtual world, and a user of the client device plays the virtual tennis match based on motion tracked input of the user, or input via an external game controller, or a combination of motion and the external game controller. In this case, a second object may be another avatar that is playing in a tennis match that is 100 meters away. Because the second object is not directly relevant to the user experience and the first object is relevant to the user experience, the client device may determine that the subscription rate of the first object is 30 Hz and the subscription rate of the second object is 3 Hz.

In an illustrative aspect, a client device (e.g., the computing system 1200) may determine the first subscription rate based on the first object corresponding to an avatar associated with another client device, the first object is affected by the avatar associated with the another client device, a distance to the first object, and the last time the first object was rendered in the simulated scene. For example, objects that have not been rendered by the client device are immaterial to the user experience based on their FOV, and updates on non-rendered objects can be delayed. However, a user may shift their FOV and some objects, such as a tennis ball for the tennis match, may not be visible, but the tennis ball remains relevant.

According to some examples, the method includes transmitting (e.g., by the computing system 1200) a request to the server with the first subscription rate for the first object and the second subscription rate for the second object at block 608. The server receives the subscription rate and transmits updates to the objects within the virtual world based on the subscription rate. This allows the client device to inform the server of relevant content to provide without involving complex calculations at the server to determine whether these events are relevant because the server has no knowledge or understanding of the virtual world (because the virtual world is provided by a user).

According to some examples, the method includes receiving (e.g., by the computing system 1200) at least one update to the first object based on the first subscription rate at a first time before an update is triggered for the second subscription rate at block 610. For example, because the subscription rate to the first object is 30 Hz, the client device receives updates related to events associated with the first object every 33.3 ms, and updates related to the second object will be received every 333.3 ms.

According to some examples, the method includes applying (e.g., by the computing system 1200) the at least one update to the first object at block 610. In one aspect, based on the at least one update to the first object, the client device may identify a position of the first object and a final position of the object, and identify how to animate the first object. For example, if the client device renders the virtual world at a frame rate of 90 FPS and receives an update to the first object at a rate of 30 FPS if the client device received network data associated with the subscription at the exact time, each update of the first object network data associated with the subscription rate would be applied to three frames.

Applying updates to the first object synchronizes the first object with respect to another object that is near the first object within the simulated scene based on a simulation time. Various aspects of applying updates to the first object will be further described below with reference to FIGS. 6, 8, and 9.

The simulation time is used to align different objects in the virtual world. Various aspects of the simulation time are further described herein with reference to FIGS. 7, 8, and 10.

According to some examples, the method includes rendering (e.g., by the computing system 1200) the simulated scene into at least one frame based on the at least one update to the first object to display the at least one frame via the client device at block 612.

Figure 7:
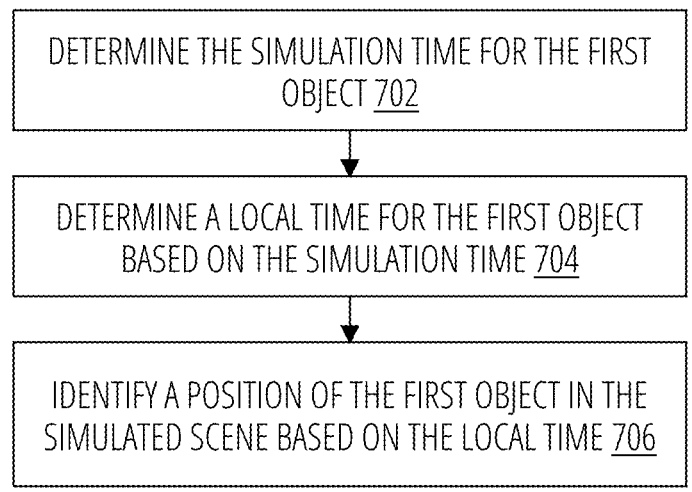
FIG. 7 illustrates an example method for synchronizing objects within a virtual reality world in accordance with some aspects of the disclosure.

FIG. 7 illustrates an example method for synchronizing objects within a virtual reality world in accordance with some aspects of the disclosure.

According to some examples, the method includes determining (e.g., by the computing system 1200) the simulation time for the first object at block 702. The simulation time may be used to synchronize objects within the virtual world and simulation time is constantly adjusted based on objects becoming more and less relevant to a user.

In one aspect, a computing system can track (e.g., by the computing system 1200) network parameters related to network data having updates to the first object in the virtual world. Non-limiting examples of network parameters comprise at least one of a latency, a jitter, an interval between network data for the first object based on the first subscription rate, and an average time to update for the first object. Another example of a network parameter includes an average time between successive network data updates that are related to the first object.

The computing system may also determine at least one average network parameter from the network data using a running average, or a sliding window average, as described above with reference to FIG. 5. Another illustrative example of an average network parameter includes a standard deviation associated with the average time between successive network data updates. In some aspects, at least one average network parameter may be a ratio between an average time between successive network updates and the standard deviation, and this ratio identifies a spread and a delay of network data. In one illustrative aspect, the network parameter may be associated with a parent object or an interacting object associated with the first object. For example, if the first object corresponds to a tennis racket that is held by an avatar, this identifies a parent-child relationship with the avatar controlling the tennis racket. In that instance, a simulation time can be weighted based on the simulation time associated with the user avatar. The simulation time of the first object (e.g., the tennis racket) can be different from the simulation time of the avatar based on some parameters, such as update frequency because the first object is not in motion as often as the first object.

After determining the simulation time at block 702, the method includes determining (e.g., by the computing system 1200) a local time for the first object based on the simulation time at block 704. The current time within the application, which may also be referred to as a game time in some applications, is used to synchronize events in the world. In one aspect, the local time of the first object can be determined based on subtracting the simulation time from the current game time. In this case, the local time identifies a point at which updates to the first object are applied to the virtual world.

After determining the local time of the first object, the method includes identifying (e.g., by the computing system 1200) the position of the first object in the simulated scene based on the local time at block 706. For example, as noted above, the update to the object can relate to an animation of the object across multiple rendered frames. In one aspect, identifying of the position can include building an animation or other effect based on the motion identified in the network data. For example, the computing system may interpolate the position of the first object in one or more frames based on the local time and network data that identifies a position of the first object in the virtual world. The first object is positioned at interpolated positions in the at least one frame. For example, if three network updates to the object are received and are to be rendered across 10 different frames, the computing system can identify the positions of the first object within the virtual world within those 10 frames. In some aspects, a non-linear approximation can be used. For example, if the object corresponds to an appendage of an avatar (e.g., an arm that is holding the tennis racket), a non-linear based approximation can be applied to the appendage to improve the fidelity of the animation.

Figure 8:
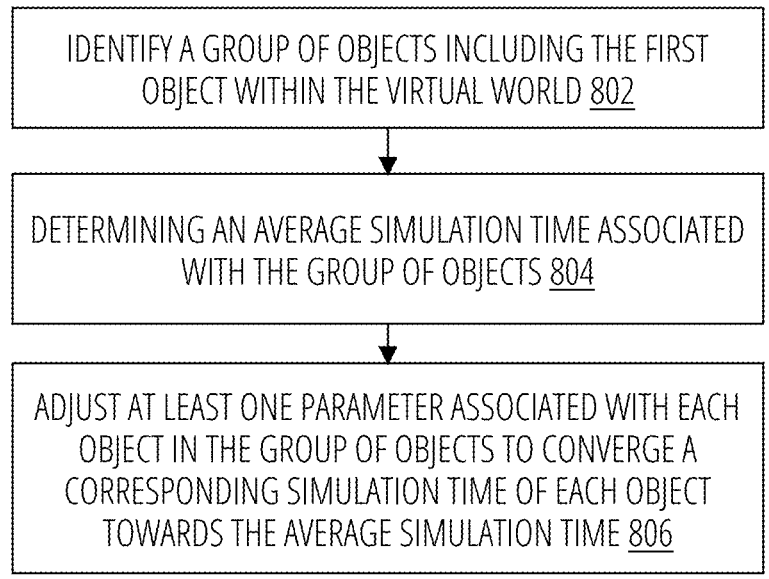
FIG. 8 illustrates an example method for grouping objects to improve synchronization of those objects within the multiuser virtual reality world in accordance with some aspects of the disclosure.

FIG. 8 illustrates an example method for grouping objects to improve synchronization of those objects within the multiuser virtual reality world in accordance with some aspects of the disclosure. In one illustrative aspect, the client device can be configured to sweep the virtual world and identify related groups. In another illustrative example, the client device can use a machine learning model or a deep learning model that is trained to identify objects that should be grouped.

According to some aspects, the method includes identifying (e.g., by the computing system 1200) a group of objects including the first object within the virtual world at block 802. In some aspects, an object is grouped into the group of objects based on at least one of a variant of the object, a time of the last update to the object, a relationship to other objects within the virtual world, and a range of simulation times. For example, objects can be clustered based on a proximity in some cases. However, in some cases, objects within that proximity may not be receiving network updates and are relatively static within the virtual world. Other objects can also be grouped based on a parent-child relationship (e.g., an avatar holding a musical instrument), or based on simulation times and proximity.

After identifying the group of objects, the method includes determining (e.g., by the computing system 1200) an average simulation time associated with the group of objects at block 804. In some cases, a ratio of the average interval between network data associated with the object and a standard deviation of the average interval between the network data may be computed at block 804.

According to some aspects, the method includes adjusting (e.g., by the computing system 1200) at least one parameter associated with each object in the group of objects to converge a corresponding simulation time of each object towards the average simulation time at block 806. In one illustrative example, the subscription rate can be changed to increase or decrease the simulation time. Simulation time can also be controlled based on various aspects, such as new objects in the scene, or objects that have received a few dozen network updates, may lock the simulation time to client's local time. Objects can also transfer relationships (e.g., parent-child) and be treated as a discontinuity in the simulation time as the object adapts to the simulation time from the old parent to the new parent. Objects that have no hierarchal relationship can also adapt simulation time of a nearby object that can interface with the object (e.g., a tennis racket that is placed on the ground near an avatar). In other cases, objects that have non-rigid bodies (e.g., non-physics) that are children of other objects will adapt to a simulation time of the parent object.

In this illustrative example, the client device (or the server) identifies logical groups of objects that should be grouped any simulation times of objects within the logical groups are incrementally adjusted to prevent any jarring transitions that would reduce an immersive effect. For example, if an object transitions from a subscription rate of 3 Hz to 30 Hz, the motion of that object would appear discontinuous and awkward within the virtual world. Instead, the method incrementally adjusts the simulation time to create a continuous animation based on updates to the object.

Figure 9:
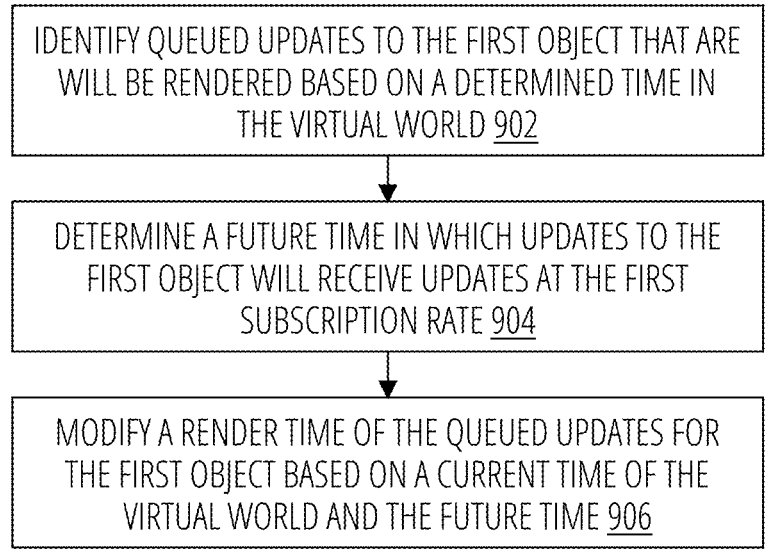
FIG. 9 illustrates an example method for compressing or expanding time for the motion of an object within the multiuser virtual reality world based on changes to a subscription rate of the object in accordance with some aspects of the disclosure.

FIG. 9 illustrates an example method for compressing or expanding time for the motion of an object within the multiuser virtual reality world based on changes to a subscription rate of the object in accordance with some aspects of the disclosure. In one illustrative aspect, abrupt changes to the subscription rate can cause animation associated with objects to appear discontinuous and janky, and compressing or expanding time for motion improves the visual fidelity of the animation.

According to some examples, the method includes identifying (e.g., by the computing system 1200) queued updates to the first object that are will be rendered based on a determined time in the virtual world at block 902. For example, as noted above, network data related to objects can be buffered to ensure that the network data can be streamed to the application executing on the client device. In this instance, when the subscription rate of the object changes, network data including updates to that object can either increase or decrease, and the queued data may need to be presented differently to provide a continuous animation of the object.

The method may include determining (e.g., by the computing system 1200) a future time in which updates to the first object will receive updates at the first subscription rate at block 904. In one illustrative example, the future time may be based on a half-round trip time from the client device to the server. For example, in half round trip time, the server will begin to send data to the client device at the faster or slower round trip rate.

After the future time is determined, the method includes modifying a render time of the queued updates for the first object based on a current time of the virtual world and the future time at block 906. In this case, the client device may render the queued update in a compressed or expanded time frame based on the subscription rate to provide a continuous animation with high fidelity.

Figure 10:
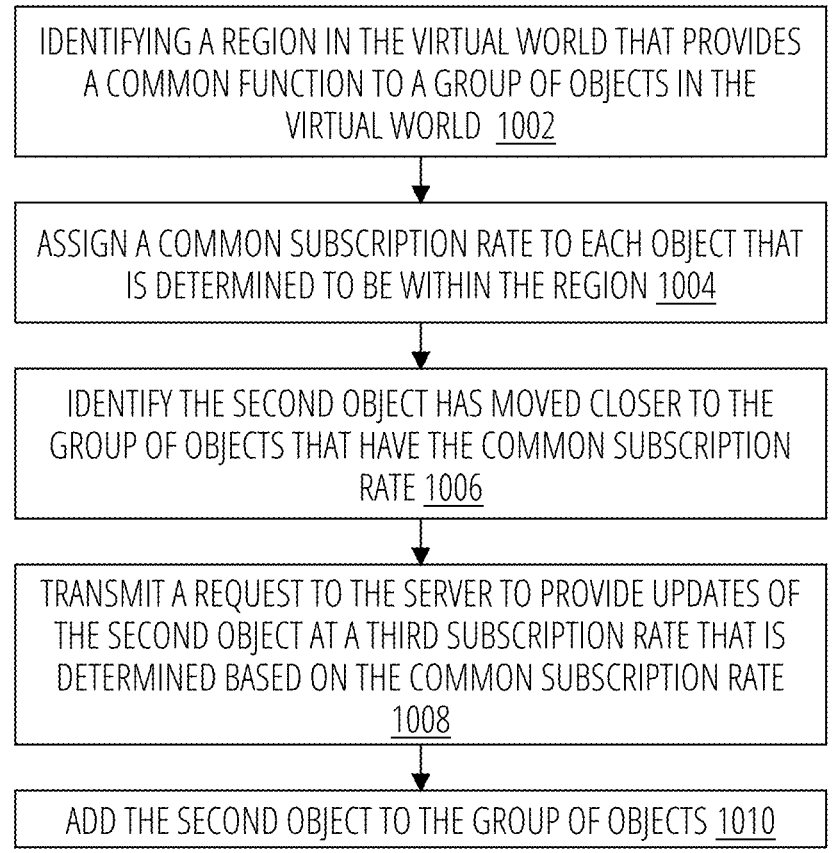
FIG. 10 illustrates an example method for grouping objects in a region based on a shared experience within the multiuser virtual reality world in accordance with some aspects of the disclosure.

FIG. 10 illustrates an example method for grouping objects in a region based on a shared experience within the multiuser virtual reality world in accordance with some aspects of the disclosure.

According to some aspects, the method includes identifying (e.g., by the computing system 1200) a region in the virtual world that provides a common function to a group of objects in the virtual world at block 1002. Non-limiting examples of a common function include participating in a virtual concert, observing a tennis match, observing a custom video game that is built into the virtual world (e.g., a tennis court), participating in a musical performance (e.g., a drum circle), and observing a theatrical performance. At least a portion of the group of objects may not be rendered in the current frame displayed by the client device. In some cases, the region can be designed based on tags or other information within a virtual world. In other cases, the region can be a large space such as a dance floor that is untagged but the presence of many avatars may indicate a common shared experience.

In one aspect, the method includes assigning (e.g., by the computing system 1200) a common subscription rate to each object that is determined to be within the region at block 1004. For example, in a concert with several hundreds of avatars that are observing the virtual concert, the events related to the observers may not be relevant to the user experience and these events can be limited to preserve bandwidth. Grouping objects within the region can reduce the complexity of the processing time to determine the simulation time of all the objects.

The method includes identifying (e.g., by the computing system 1200) that the second object has moved closer to the group of objects that have the common subscription rate at block 1006.

After identifying that the second object approaches the region the method includes transmitting (e.g., by the computing system 1200) a request to the server to provide updates of the second object at a third subscription rate that is determined based on the common subscription rate at block 1008. In some aspects, as object moves closer to the region, the subscription of those objects are dynamically changed.

According to some examples, the method includes, when the second object has moved within a threshold distance of the group of objects, adding (e.g., by the computing system 1200) the second object to the group of objects at block 1010. In this illustrative aspect, as an object approaches a particular region, the simulation time of that object is controlled to converge on a common subscription rate and eventually be grouped based on that region. The threshold can be based on a number of factors, such as the size of the region, the number of avatars within the region, etc.

Figure 11:
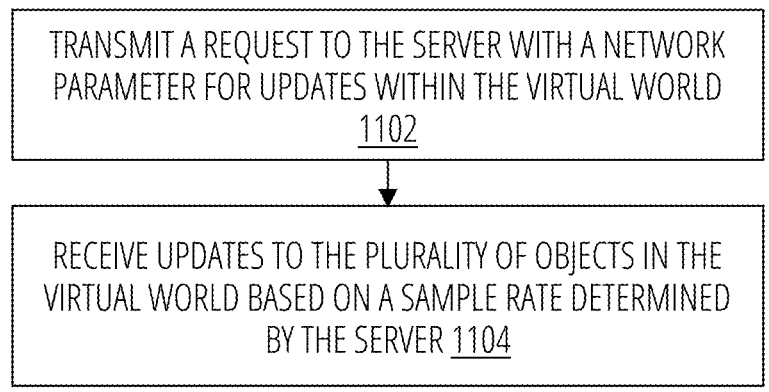
FIG. 11 illustrates an example method for subscribing to events based on network parameters provided to the server.

FIG. 11 illustrates an example method for subscribing to events based on network parameters provided to the server.

According to some examples, the method includes transmitting a request to the server with a network parameter for updates within the virtual world at block 1102. An illustrative example of a network parameter is an upper boundary of a network traffic per unit time (e.g., a bandwidth limit of 60 kbps). Based on the bandwidth limit, the server may identify objects within the virtual world and determine a subscription rate for each object. In some cases, network data associated with the various object can be grouped into a single packet, which can simplify the synchronization of multiple objects within the virtual world and may improve the fidelity of animation of the objects.

In one illustrative aspect, the request identifies a related object in the plurality of objects that has a priority in the virtual world based on the related object corresponding to an avatar associated with another client device, the related object is affected by the avatar associated with the another client device, a distance to the related object, and the last time the related object was rendered in the simulated scene.

According to some examples, the method includes receiving updates to the plurality of objects in the virtual world based on a sample rate determined by the server at block 1104.

Figure 12:
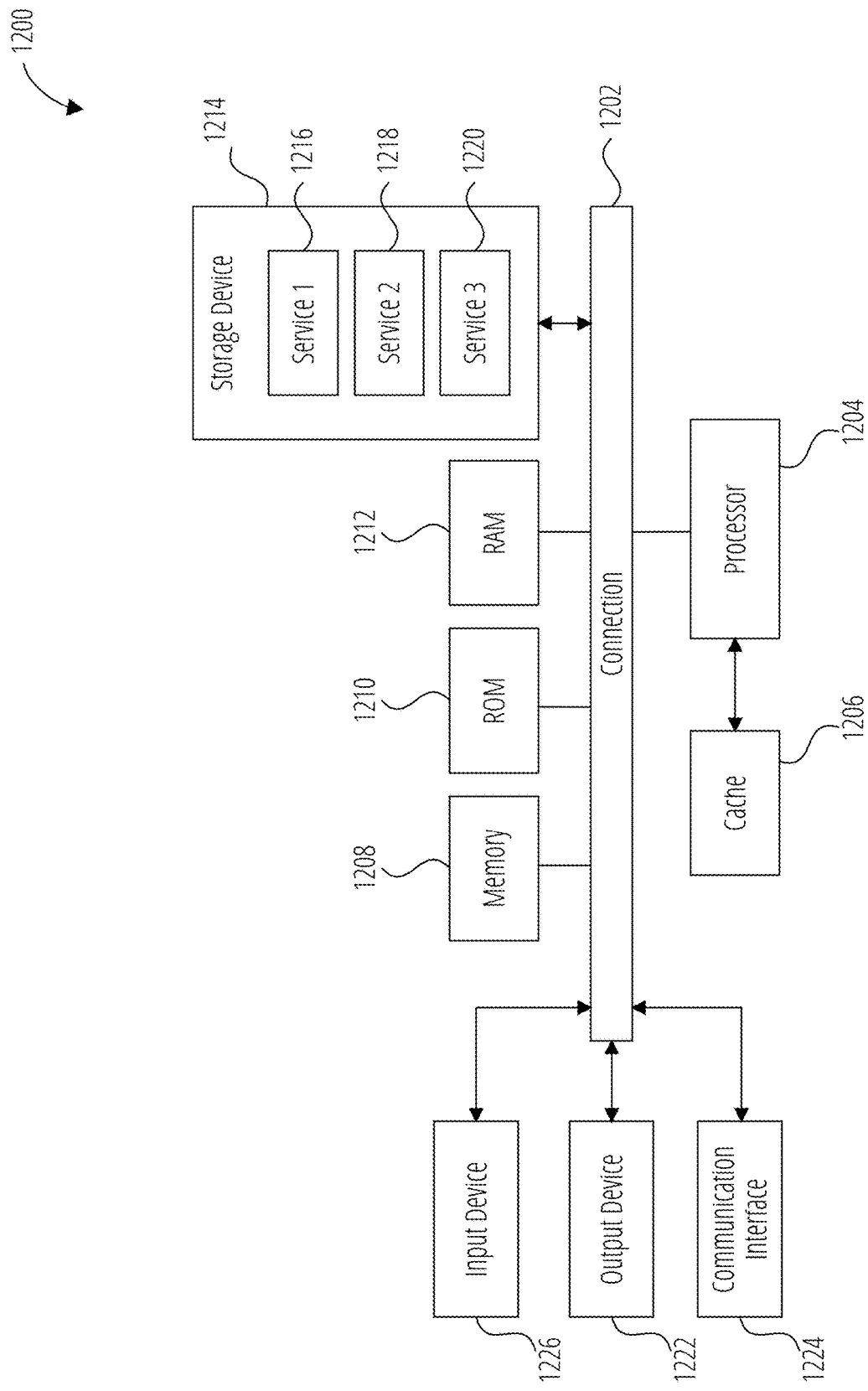
FIG. 12 shows an example of a system for implementing certain aspects of the present technology.

FIG. 12 shows an example of computing system 1200, which can be for example any computing device making up client device 106, or web services 110, or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Computing system 1200 can include a cache of high-speed memory 1206 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1214 can include software services, servers, services, etc., that when the code that defines such software is executed by the processor 1204, it causes the system to perform a function. In some embodiments, a hardware service that performs a particular function can include the software component stored in a computer-readable medium in connection with the necessary hardware components, such as processor 1204, connection 1202, output device 1222, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative aspects of the disclosure include:

Aspect 1: A method comprising: rendering a simulated scene in a client device, the simulated scene including a plurality of objects within a virtual world that are rendered into the simulated scene based on in information provided from a server that coordinates with other client devices, wherein the plurality of objects are provided to the server from the other client devices; identifying an object within the plurality of objects within the simulated scene that is relevant to the simulated scene; determining a first subscription rate associated with a first object and a second subscription rate for a second object within the simulated scene, wherein the first subscription rate is greater than the second subscription rate; transmitting a request to the server with the first subscription rate for the first object and the second subscription rate for the second object; receiving at least one update to the first object based on the first subscription rate at a first time before an update is triggered for the second subscription rate; applying the at least one update to the first object; and rendering the simulated scene into at least one frame based on the at least one update to the first object to display the at least one frame via the client device.

Aspect 2: The method of Aspect 1, wherein the virtual world is provided to the server from another client device that identifies other objects in the virtual world that can interact with the other objects.

Aspect 3: The method of any of Aspects 1 to 2, wherein the object comprises an avatar associated with another client device that is rendered in the simulated scene, an object associated with an avatar, or an object associated with the virtual world that can be interacted with.

Aspect 4: The method of any of Aspects 1 to 3, wherein applying updates to the first object synchronizes the first object with respect to another object that is near the first object within the simulated scene based on a simulation time.

Aspect 5: The method of any of Aspects 1 to 4, wherein applying updates to the first object comprises: determining the simulation time for the first object; determining a local time for the first object based on the simulation time; and identifying a position of the first object in the simulated scene based on the local time.

Aspect 6: The method of any of Aspects 1 to 5, wherein determining the simulation time for the first object comprises: tracking network parameters associated network data related to updates to the first object in the virtual world; determining at least one average network parameter from the network data using a running average; and determining the simulation time for the first object based on the at least one average network parameter.

Aspect 7: The method of any of Aspects 1 to 6, wherein the network parameters comprise at least one of a latency, a jitter, an interval between network data for the first object based on the first subscription rate, and an average time to update for the first object.

Aspect 8: The method of any of Aspects 1 to 7, wherein the network parameters are weighted based on a parent object associated with the first object.

Aspect 9: The method of any of Aspects 1 to 8, wherein determining the local time for the first object comprises: subtracting the simulation time for a current time of associated with the virtual world to yield the local time of the first object.

Aspect 10: The method of any of Aspects 1 to 9, wherein identifying the position of the first object comprises: interpolating the position of the first object in one or more frames based on the local time and network data that identifies a position of the first object in the virtual world, wherein the first object is positioned at interpolated positions in the at least one frame.

Aspect 11: The method of any of Aspects 1 to 10, further comprising: identifying a group of objects including the first object within the virtual world; determining an average simulation time associated with the group of objects; and adjusting at least one parameter associated with each object in the group of objects to converge a corresponding simulation time of each object towards the average simulation time.

Aspect 12: The method of any of Aspects 1 to 11, wherein an object is grouped into the group of objects based on at least one of a variant of the object, a time of a last update to the object, a relationship to other objects within the virtual world, and a range of simulation times.

Aspect 13: The method of any of Aspects 1 to 12, further comprising: determining the first subscription rate based on the first object corresponding to an avatar associated with another client device, the first object is affected by the avatar associated with the another client device, a distance to the first object, and a last time the first object was rendered in the simulated scene.

Aspect 14: The method of any of Aspects 1 to 13, after transmitting a request to the server with the first subscription rate and the second subscription rate, identifying queued updates to the first object that are will be rendered based on a determined time in the virtual world; and determining a future time in which updates to the first object will receive updates at the first subscription rate; and modifying a render time of the queued updates for the first object based on a current time of the virtual world and the future time.

Aspect 15: The method of any of Aspects 1 to 14, wherein the future time is based on a half round trip time from the client device to the server.

Aspect 16: The method of any of Aspects 1 to 15, further comprising: identifying a region in the virtual world that provides a common function to a group of objects in the virtual world; and assigning a common subscription rate to each object that is determined to be within the region.

Aspect 17: The method of any of Aspects 1 to 16, further comprising: identifying the second object has moved closer to the group of objects that have the common subscription rate; and transmitting a request to the server to provide updates of the second object at a third subscription rate that is determined based on the common subscription rate.

Aspect 18: The method of any of Aspects 1 to 17, further comprising: when the second object has moved within a threshold distance of the group of objects, adding the second object to the group of objects.

Aspect 19: The method of any of Aspects 1 to 18, wherein at least a portion of the group of objects are being rendered in a current frame displayed by the client device.

Aspect 20: The method of any of Aspects 1 to 19, further comprising: transmitting a request to the server with a network parameter for updates within the virtual world; and receiving updates to the plurality of objects in the virtual world based on a sample rate determined by the server.

Aspect 21: The method of any of Aspects 1 to 20, wherein the request identifies a related object in the plurality of objects that has a priority in the virtual world based on the related object corresponding to an avatar associated with another client device, the related object is affected by the avatar associated with the another client device, a distance to the related object, and a last time the related object was rendered in the simulated scene.

Aspect 22: The method of any of Aspects 1 to 21, wherein the network parameter comprises an upper boundary of a network traffic per unit time.

Aspect 23: A. apparatus includes a storage (implemented in circuitry) configured to store instructions and a processor. The processor configured to execute the instructions and cause the processor to: render a simulated scene in a client device, the simulated scene including a plurality of objects within a virtual world that are rendered into the simulated scene based on in information provided from a server that coordinates with other client devices, wherein the plurality of objects are provided to the server from the other client devices; identify an object within the plurality of objects within the simulated scene that is relevant to the simulated scene; determine a first subscription rate associated with a first object and a second subscription rate for a second object within the simulated scene, wherein the first subscription rate is greater than the second subscription rate; transmit a request to the server with the first subscription rate for the first object and the second subscription rate for the second object; receive at least one update to the first object based on the first subscription rate at a first time before an update is triggered for the second subscription rate; apply the at least one update to the first object; and render the simulated scene into at least one frame based on the at least one update to the first object to display the at least one frame via the client device.

Aspect 24: The apparatus of Aspect 23, wherein the virtual world is provided to the server from another client device that identifies other objects in the virtual world that can interact with the other objects.

Aspect 25: The apparatus of any of Aspects 23 to 24, wherein the object comprises an avatar associated with another client device that is rendered in the simulated scene, an object associated with an avatar, or an object associated with the virtual world that can be interacted with.

Aspect 26: The apparatus of any of Aspects 23 to 25, wherein applying updates to the first object synchronizes the first object with respect to another object that is near the first object within the simulated scene based on a simulation time.

Aspect 27: The apparatus of any of Aspects 23 to 26, wherein the processor is configured to execute the instructions and cause the processor to: determine the simulation time for the first object; determine a local time for the first object based on the simulation time; and identify a position of the first object in the simulated scene based on the local time.

Aspect 28: The apparatus of any of Aspects 23 to 27, wherein the processor is configured to execute the instructions and cause the processor to: track network parameters associated network data related to updates to the first object in the virtual world; determine at least one average network parameter from the network data using a running average; and determine the simulation time for the first object based on the at least one average network parameter.

Aspect 29: The apparatus of any of Aspects 23 to 28, wherein the network parameters comprise at least one of a latency, a jitter, an interval between network data for the first object based on the first subscription rate, and an average time to update for the first object.

Aspect 30: The apparatus of any of Aspects 23 to 29, wherein the network parameters are weighted based on a parent object associated with the first object.

Aspect 31: The apparatus of any of Aspects 23 to 30, wherein the processor is configured to execute the instructions and cause the processor to: subtract the simulation time for a current time of associated with the virtual world to yield the local time of the first object.

Aspect 32: The apparatus of any of Aspects 23 to 31, wherein the processor is configured to execute the instructions and cause the processor to: interpolate the position of the first object in one or more frames based on the local time and network data that identifies a position of the first object in the virtual world, wherein the first object is positioned at interpolated positions in the at least one frame.

Aspect 33: The apparatus of any of Aspects 23 to 32, wherein the processor is configured to execute the instructions and cause the processor to: identify a group of objects including the first object within the virtual world; determine an average simulation time associated with the group of objects; and adjust at least one parameter associated with each object in the group of objects to converge a corresponding simulation time of each object towards the average simulation time.

Aspect 34: The apparatus of any of Aspects 23 to 33, wherein an object is grouped into the group of objects based on at least one of a variant of the object, a time of a last update to the object, a relationship to other objects within the virtual world, and a range of simulation times.

Aspect 35: The apparatus of any of Aspects 23 to 34, wherein the processor is configured to execute the instructions and cause the processor to: determine the first subscription rate based on the first object corresponding to an avatar associated with another client device, the first object is affected by the avatar associated with the another client device, a distance to the first object, and a last time the first object was rendered in the simulated scene.

Aspect 36: The apparatus of any of Aspects 23 to 35, wherein the processor is configured to execute the instructions and cause the processor to: after transmitting a request to the server with the first subscription rate and the second subscription rate, identify queued updates to the first object that are will be rendered based on a determined time in the virtual world; and determine a future time in which updates to the first object will receive updates at the first subscription rate; and modify a render time of the queued updates for the first object based on a current time of the virtual world and the future time.

Aspect 37: The apparatus of any of Aspects 23 to 36, wherein the future time is based on a half round trip time from the client device to the server.

Aspect 38: The apparatus of any of Aspects 23 to 37, wherein the processor is configured to execute the instructions and cause the processor to: identify a region in the virtual world that provides a common function to a group of objects in the virtual world; and assign a common subscription rate to each object that is determined to be within the region.

Aspect 39: The apparatus of any of Aspects 23 to 38, wherein the processor is configured to execute the instructions and cause the processor to: identify the second object has moved closer to the group of objects that have the common subscription rate; and transmit a request to the server to provide updates of the second object at a third subscription rate that is determined based on the common subscription rate.

Aspect 40: The apparatus of any of Aspects 23 to 39, wherein the processor is configured to execute the instructions and cause the processor to: when the second object has moved within a threshold distance of the group of objects, add the second object to the group of objects.

Aspect 41: The apparatus of any of Aspects 23 to 40, wherein at least a portion of the group of objects are being rendered in a current frame displayed by the client device.

Aspect 42: The apparatus of any of Aspects 23 to 41, wherein the processor is configured to execute the instructions and cause the processor to: transmit a request to the server with a network parameter for updates within the virtual world; and receive updates to the plurality of objects in the virtual world based on a sample rate determined by the server.

Aspect 43: The apparatus of any of Aspects 23 to 42, wherein the request identifies a related object in the plurality of objects that has a priority in the virtual world based on the related object corresponding to an avatar associated with another client device, the related object is affected by the avatar associated with the another client device, a distance to the related object, and a last time the related object was rendered in the simulated scene.

Aspect 44: The apparatus of any of Aspects 23 to 43, wherein the network parameter comprises an upper boundary of a network traffic per unit time.

Aspect 45: The apparatus of any of Aspects 23 to 44, wherein the apparatus comprises a head mounted device that is attached to a wearer's head.

Aspect 46: The apparatus of any of Aspects 23 to 44, wherein the apparatus comprises a computing system.

Aspect 47: A non-transitory computer-readable medium comprising instructions which, when executed by one or more processors, cause the one or more processors to perform operations according to any of Aspects 1 to 22.

Aspect 48: An apparatus comprising means for performing operations according to any of Aspects 1 to 22.

What is claimed is:

1. A method comprising:
rendering a simulated scene in a client device, the simulated scene including a plurality of objects within a virtual world that are rendered into the simulated scene based on information provided from a server that coordinates with other client devices, wherein the plurality of objects are provided to the server from the other client devices;
identifying an object within the plurality of objects within the simulated scene that is relevant to the simulated scene;
determining a first subscription rate associated with a first object and a second subscription rate for a second object within the simulated scene, wherein the first subscription rate is greater than the second subscription rate;
transmitting a request to the server with the first subscription rate for the first object and the second subscription rate for the second object;
receiving at least one update to the first object based on the first subscription rate at a first time before an update is triggered for the second subscription rate;
applying the at least one update to the first object to synchronize the first object with respect to another object that is near the first object within the simulated scene based on a simulation time, wherein the simulation time is associated with network parameters associated with network data related to updates to the first object in the virtual world;
rendering the simulated scene into at least one frame based on the at least one update to the first object to display the at least one frame via the client device; and
identifying a group of objects including the first object within the virtual world to have an average simulation time for each object in the group of objects.

2. The method of claim 1, wherein applying the at least one update to the first object comprises:
determining the simulation time for the first object;
determining a local time for the first object based on the simulation time; and
identifying a position of the first object in the simulated scene based on the local time.

3. The method of claim 2, wherein determining the simulation time for the first object comprises:
tracking the network parameters associated with the network data related to updates to the first object in the virtual world;

determining at least one average network parameter from the network data using a running average; and determining the simulation time for the first object based on the at least one average network parameter.

4. The method of claim 2, wherein determining the local time for the first object comprises:

subtracting the simulation time for a current time of associated with the virtual world to yield the local time of the first object.

5. The method of claim 2, wherein identifying the position of the first object comprises:

interpolating the position of the first object in one or more frames based on the local time and network data that identifies a position of the first object in the virtual world, wherein the first object is positioned at interpolated positions in the at least one frame.

6. The method of claim 1, further comprising:

determining the average simulation time associated with the group of objects; and adjusting at least one parameter associated with each object in the group of objects to converge a corresponding simulation time of each object towards the average simulation time.

7. The method of claim 6, wherein an object is grouped into the group of objects based on at least one of a variant of the object, a time of a last update to the object, a relationship to other objects within the virtual world, and a range of simulation times.

8. The method of claim 1, further comprising:

determining the first subscription rate based on the first object corresponding to an avatar associated with another client device, wherein the first subscription rate is affected by the avatar associated with the another client device, a distance to the first object, and a last time the first object was rendered in the simulated scene.

9. The method of claim 1, wherein the virtual world is provided to the server from a second client device that identifies other objects in the virtual world that can interact with the other objects, and wherein the object comprises an avatar associated with a third client device that is rendered in the simulated scene, an object associated with an avatar, or an object associated with the virtual world that can be interacted with.

10. An apparatus, comprising:

a storage configured to store instructions; and a processor configured to execute the instructions and cause the processor to:

render a simulated scene in a client device, the simulated scene including a plurality of objects within a virtual world that are rendered into the simulated scene based on in information provided from a server that coordinates with other client devices, wherein the plurality of objects are provided to the server from the other client devices;

identify an object within the plurality of objects within the simulated scene that is relevant to the simulated scene;

determine a first subscription rate associated with a first object and a second subscription rate for a second object within the simulated scene, wherein the first subscription rate is greater than the second subscription rate;

transmit a request to the server with the first subscription rate for the first object and the second subscription rate for the second object;

receive at least one update to the first object based on the first subscription rate at a first time before an update is triggered for the second subscription rate;

apply the at least one update to the first object;

render the simulated scene into at least one frame based on the at least one update to the first object to display the at least one frame via the client device;

identify the second object has moved closer to a group of objects that have a common subscription rate; and transmit a request to the server to provide updates of the second object at a third subscription rate that is determined based on the common subscription rate.

11. The apparatus of claim 10, wherein the processor configured to execute instructions and cause the processor to:

after transmitting a request to the server with the first subscription rate and the second subscription rate, identify queued updates to the first object that are will be rendered based on a determined time in the virtual world; and determine a future time in which updates to the first object will receive updates at the first subscription rate; and modify a render time of the queued updates for the first object based on a current time of the virtual world and the future time.

12. The apparatus of claim 11, wherein the future time is based on a half round trip time from the client device to the server.

13. The apparatus of claim 10, wherein the processor configured to execute instructions and cause the processor to:

identify a region in the virtual world that provides a common function to the group of objects in the virtual world; and assign the common subscription rate to each object that is determined to be within the region.

14. The apparatus of claim 13, wherein the processor configured to execute instructions and cause the processor to:

when the second object has moved within a threshold distance of the group of objects, add the second object to the group of objects.

15. The apparatus of claim 13, wherein at least a portion of the group of objects are being rendered in a current frame displayed by the client device.

16. The apparatus of claim 10, wherein the processor configured to execute instructions and cause the processor to:

transmit a request to the server with a network parameter for updates within the virtual world; and receive updates to the plurality of objects in the virtual world based on a sample rate determined by the server.

17. The apparatus of claim 16, wherein the request identifies a related object in the plurality of objects that has a priority in the virtual world based on the related object corresponding to an avatar associated with another client device, the related object is affected by the avatar associated with the another client device, a distance to the related object, and a last time the related object was rendered in the simulated scene.

18. The apparatus of claim 16, wherein the network parameter comprises an upper boundary of a network traffic per unit time.

* * * * *